United States Patent
Aslam et al.

(10) Patent No.: US 12,220,873 B2
(45) Date of Patent: Feb. 11, 2025

(54) MODULAR SYSTEM AND METHOD FOR A THREE DIMENSIONAL PRINTING DEVICE

(71) Applicant: BD Engineering LLC, Upton, MA (US)

(72) Inventors: Ali Aslam, Upton, MA (US); Matthew Gesner, Upton, MA (US)

(73) Assignee: BD Engineering LLC, Upton, MA (US)

( * ) Notice: Subject to any disclaimer, the term of this patent is extended or adjusted under 35 U.S.C. 154(b) by 8 days.

(21) Appl. No.: 18/074,601

(22) Filed: Dec. 5, 2022

(65) Prior Publication Data
US 2023/0173762 A1 Jun. 8, 2023

Related U.S. Application Data

(60) Provisional application No. 63/265,007, filed on Dec. 6, 2021.

(51) Int. Cl.
*B29C 64/393* (2017.01)
*B29C 64/118* (2017.01)
(Continued)

(52) U.S. Cl.
CPC .......... *B29C 64/393* (2017.08); *B29C 64/118* (2017.08); *B29C 64/209* (2017.08);
(Continued)

(58) Field of Classification Search
CPC ... B29C 64/393; B29C 64/118; B29C 64/209; B29C 64/321; B29C 64/336; B33Y 30/00; B33Y 50/02; B33Y 40/00
See application file for complete search history.

(56) References Cited

U.S. PATENT DOCUMENTS 9,266,286 B1 2/2016 Starodubtsev
9,577,466 B2 2/2017 Ku et al.
(Continued)

FOREIGN PATENT DOCUMENTS

CA    3043048 A1 * 6/2018 ............. B22D 11/01

OTHER PUBLICATIONS

CA-3043048-A1 (Year: 2018).*

*Primary Examiner* — Jeffrey M Wollschlager
*Assistant Examiner* — Guy F Mongelli
(74) *Attorney, Agent, or Firm* — McCarter & English, LLP; Dave S. Christensen; Katarina Overberg

(57) ABSTRACT

A system for operating handheld three-dimensional filament extrusion device is provided. The system includes a housing with an inlet and an outlet. A Bowden style mechanism is coupled to the housing and has a motor coupled to a filament engagement mechanism. A filament holder is coupled to the housing and transfers the filament to the Bowden style mechanism. A 3D drawing device defines a pathway that receives filament from the outlet and transfers the filament to a heated section. The drawing device includes a nozzle coupled to the heated section and an actuator. A controller having a processor is responsive to an actuation of the at least one actuator for causing the motor to rotate in a first direction to move the filament through the inlet and outlet to the drawing device and to cause the heated section to at least partially melt the filament moving through the drawing device.

13 Claims, 18 Drawing Sheets

(51) Int. Cl.
 B29C 64/209 (2017.01)
 B29C 64/321 (2017.01)
 B29C 64/336 (2017.01)
 B33Y 30/00 (2015.01)
 B33Y 50/02 (2015.01)
(52) U.S. Cl.
 CPC .......... B29C 64/321 (2017.08); B29C 64/336 (2017.08); B33Y 30/00 (2014.12); B33Y 50/02 (2014.12)

(56) References Cited

U.S. PATENT DOCUMENTS

| | | |
|---|---|---|
| 9,649,948 B2 | 5/2017 | Bell et al. |
| 10,040,235 B2 | 8/2018 | Bogue et al. |
| 10,427,549 B2 | 10/2019 | Yang et al. |
| 10,792,850 B2 | 10/2020 | Dilworth et al. |
| 10,850,634 B2 | 12/2020 | Wang et al. |
| 2016/0368218 A1* | 12/2016 | Cruz ..................... B29C 64/232 |
| 2017/0144369 A1 | 5/2017 | Suvorov et al. |
| 2017/0151704 A1* | 6/2017 | Go ........................ B29C 48/266 |
| 2017/0368771 A1* | 12/2017 | Harrier ................... B29C 73/04 |
| 2018/0009161 A1* | 1/2018 | Cowen .................. B29C 64/205 |
| 2019/0270254 A1* | 9/2019 | Mark ..................... B29C 64/118 |
| 2019/0358992 A1 | 11/2019 | Xie |
| 2020/0114422 A1* | 4/2020 | Mark ......................... B22F 1/10 |
| 2020/0139624 A1* | 5/2020 | Khondoker ........... B29C 64/118 |
| 2021/0154916 A1* | 5/2021 | Kazmer ................. B33Y 30/00 |
| 2021/0197677 A1 | 7/2021 | Terada |

* cited by examiner

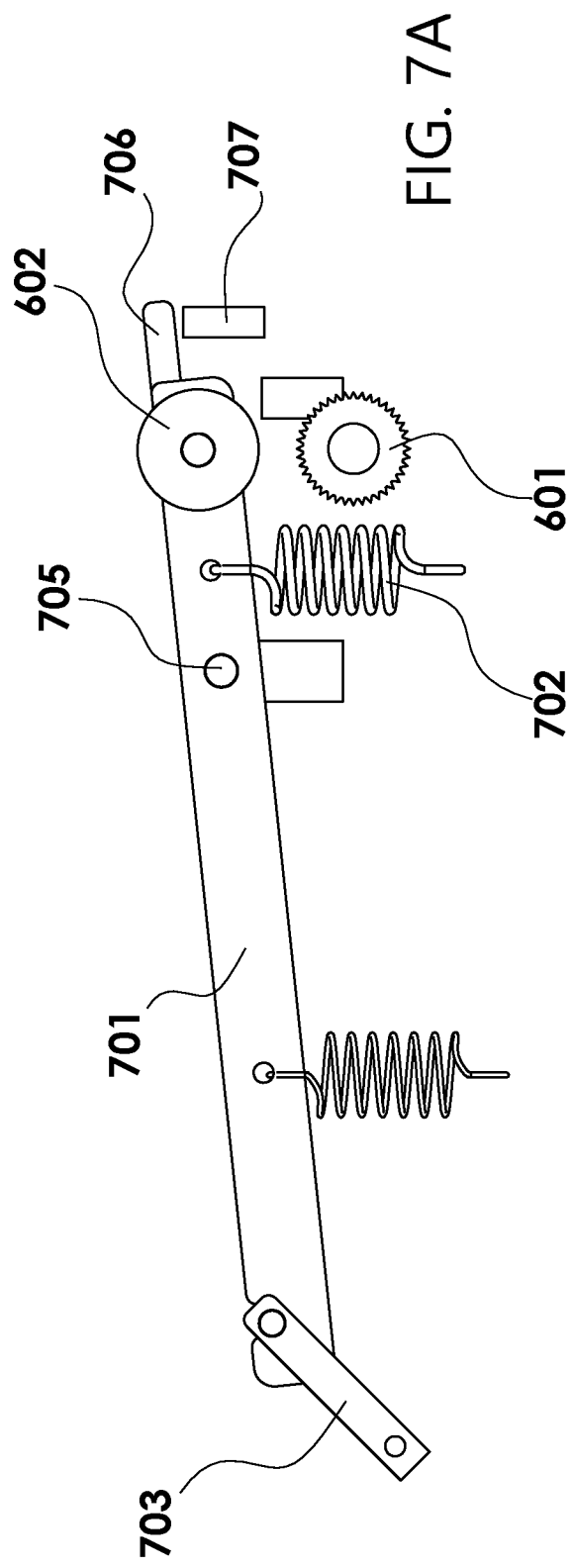
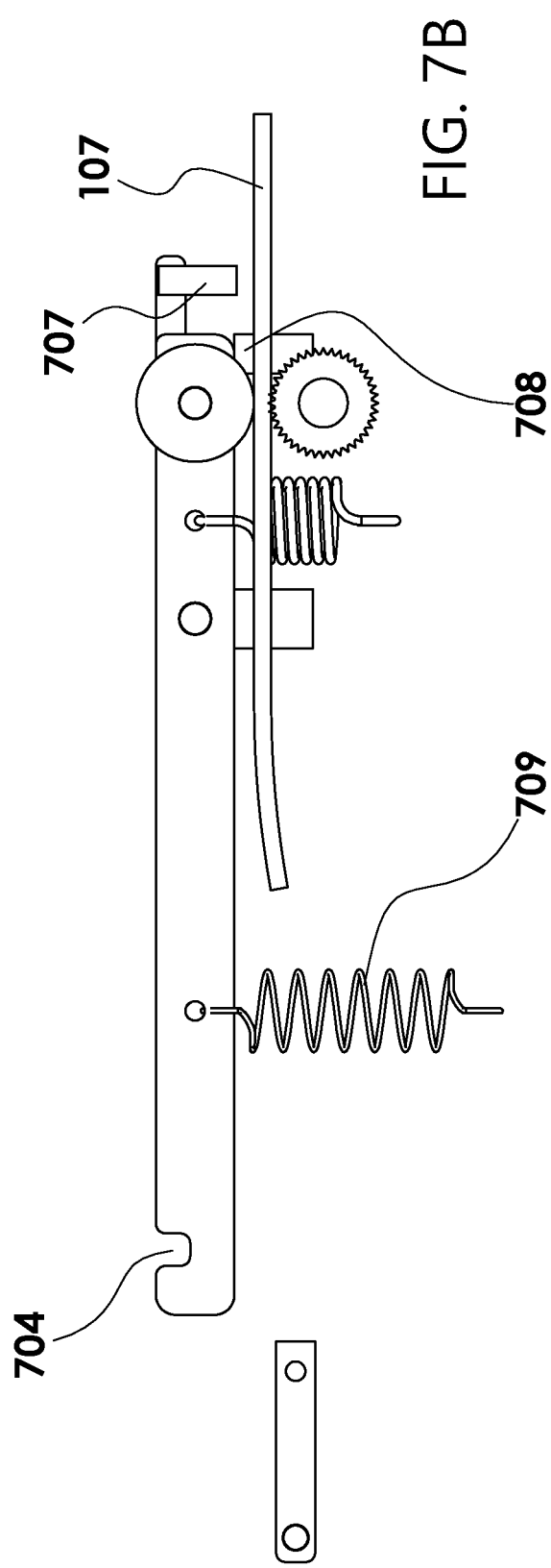
FIG. 7A
FIG. 7B

MODULAR SYSTEM AND METHOD FOR A THREE DIMENSIONAL PRINTING DEVICE

CROSS-REFERENCE TO RELATED APPLICATIONS

This application claims the benefit of U.S. Provisional Application No. 63/265,007, filed Dec. 6, 2021, the contents of which are incorporated by reference herein in their entirety.

BACKGROUND OF THE DISCLOSURE

The subject matter disclosed herein relates to an additive manufacturing device, and in particular to a handheld three-dimensional printing system.

Prior art handheld or pen type three-dimensional printing devices ("3D Pens") have been proposed that allow a user to move the print head to generate ad hoc shapes. Examples of this type of 3D Pen includes U.S. Pat. No. 10,792,850B2 and U.S. Pat. No. 10,040,235B2.

These prior art systems are suitable for their intended purposes, but have the following drawbacks. First, all sub-systems (extrusion mechanism, motor control, electronics, hotend, etc.) are contained within the 3D Pen body. This results in large, bulky and unwieldy drawing devices. It also presents design challenges in thermal control of the hotend and motor packaging in such a small physical volume. Next, the user interface and methods of controlling the pen (adjusting motor speed, temperature, filament type, etc.) must also be fit within the pen body. This causes the user experience to suffer and limits the options for improving it. Further, the motor often must be a very small DC motor and that limits the torque output options that are available, as well as electronic control motor control strategies. This in turn results in the use of complicated gearboxes to increase torque to an acceptable level. Using something like a stepper motor is impractical due to size constraints.

As a result, existing 3D Pens have very limited overall flexibility. Making a 3D pen creation often involves using other accessories, such as a temperature controlled "smoothing device" or "hot knife". By and large the user is left to figure out these accessories on their own.

Accordingly, while existing 3D Pens are suitable for their intended purposes the need for improvement remains, particular in providing a handheld 3D printing system having the features described herein.

BRIEF DESCRIPTION OF THE DISCLOSURE

According to one aspect of the disclosure a system is provided. The system includes a base station having a housing with an inlet and an outlet. A Bowden style mechanism is coupled to the housing adjacent the inlet, the Bowden style mechanism having a motor operably coupled to a filament engagement mechanism. A filament holder having filament is disposed thereon, the filament holder being operably coupled to the housing and arranged to transfer the filament to the Bowden style mechanism. A three-dimensional drawing device separate from the base station and sized to be held by a single user is provided, the drawing device defining a pathway that receives filament from the outlet and transfers the filament to a heated section, the drawing device having a nozzle removably coupled to the heated section to receive the filament, and the drawing device further having at least one actuator. A controller having a processor is provided, the controller being coupled to communicate with the motor, the heated section and the at least one actuator, the processor being responsive to executable computer instructions in response to an actuation of the at least one actuator for causing the motor to rotate in a first direction to move the filament through the inlet and outlet to the drawing device and to cause the heated section to at least partially melt the filament moving through the drawing device.

In addition to one or more of the features described herein, or as an alternative, further embodiments of the system may include a low friction tube operably coupling the outlet to the drawing device, wherein the low friction tube at least partially defines the pathway. In addition to one or more of the features described herein, or as an alternative, further embodiments of the system may include a user interface operably coupled to the base station and the controller, the user interface being configured to provide visual feedback to the user and allow the user to define parameters to the controllers, the parameters include at least one of: a heated section temperature, a motor speed, and a retraction amount. In addition to one or more of the features described herein, or as an alternative, further embodiments of the system may include the processor being further responsive to cause the motor to rotate in a second direction in response to the actuation of the actuator being stopped, the second direction being the opposite of the first direction.

In addition to one or more of the features described herein, or as an alternative, further embodiments of the system may include at least one accessory port and at least one accessory electrically coupled to the at least one accessory port, the at least one accessory being selected from a group consisting of: temperature controlled smoothing device, a temperature controlled hot knife, a temperature controlled sculpting device, foot pedal, and a cooling fan. In addition to one or more of the features described herein, or as an alternative, further embodiments of the system may include he heated section having a thermistor In addition to one or more of the features described herein, or as an alternative, further embodiments of the system may include the housing further having a cradle/holder element, the holder element being sized and shaped to retain the drawing device. In addition to one or more of the features described herein, or as an alternative, further embodiments of the system may include the holder element being integral with the filament holder.

In addition to one or more of the features described herein, or as an alternative, further embodiments of the system may include the filament engagement mechanism further including: a filament engagement member configured rotate and engage the filament: a idler wheel rotationally coupled to an engagement handle, the engagement handle being rotatable between an open position, inserted position, and an idle position; and wherein the idler wheel is positioned to push the filament against the filament engagement member when in the inserted position, and is spaced apart from the filament engagement member a distance sufficient for filament to pass freely therethrough when in the open position.

In addition to one or more of the features described herein, or as an alternative, further embodiments of the system may include base station having a plurality of Bowden extrusion mechanisms, each of the Bowden extrusion mechanisms being configured to transfer filament to different three-dimensional drawing devices. In addition to one or more of the features described herein, or as an alternative, further embodiments of the system may include n the controller having a wireless communication circuit.

In addition to one or more of the features described herein, or as an alternative, further embodiments of the system may include the drawing device having a second controller coupled to communicate with the controller. In addition to one or more of the features described herein, or as an alternative, further embodiments of the system may include the second controller being coupled to communicate with the controller via a wired or wireless communications medium.

In addition to one or more of the features described herein, or as an alternative, further embodiments of the system may include the processor being further responsive to an input from the user interface to change a response of the controller when the actuator is actuated.

In addition to one or more of the features described herein, or as an alternative, further embodiments of the system may include the at least one accessory being a foot pedal, and the processor is responsive to changing the speed of the motor in response to the foot pedal being depressed.

In addition to one or more of the features described herein, or as an alternative, further embodiments of the system may include the controller further having a microphone and the processor is further responsive to change a parameter in response to a user voice command.

In addition to one or more of the features described herein, or as an alternative, further embodiments of the system may include the at least one actuator having a scroll wheel, the controller and user interface being responsive to movement of the scroll wheel to change a graphical user interface on the user interface.

In addition to one or more of the features described herein, or as an alternative, further embodiments of the system may include the controller and the heated section cooperating to limit a temperature of the drawing device below a temperature of 118 degrees. In addition to one or more of the features described herein, or as an alternative, further embodiments of the system may include the processor being responsive to an input from the user to remove the temperature limit from the drawing.

According to one aspect of the disclosure a system is provided. The system including a base station having a housing with a first inlet and a first outlet. A first extrusion mechanism is coupled to the housing adjacent the inlet, the first extrusion mechanism having a first motor operably coupled to a first filament engagement mechanism. A first filament holder having a first filament disposed thereon, the first filament holder being operably coupled to the housing and arranged to transfer the first filament to the first extrusion mechanism. A first three-dimensional drawing device separate from the base station and sized to be held by a single user is provided, the first drawing device defining a first pathway that receives the first filament from the outlet and transfers the first filament to a first heated section, the first drawing device having a nozzle removably coupled to the first heated section to receive the first filament. A controller having a processor is provided, the controller being coupled to communicate with the first motor and the first heated section, the processor being responsive to executable computer instructions in response to an input from a user to cause the first motor to rotate in a first direction to move the first filament through the first inlet and first outlet to the first drawing device and to cause the first heated section to at least partially melt the first filament moving through the first drawing device.

In addition to one or more of the features described herein, or as an alternative, further embodiments of the system may include the input from the user being an actuation of an actuator on the first drawing device or a depression of a foot pedal.

In addition to one or more of the features described herein, or as an alternative, further embodiments of the system may include: a second extrusion mechanism coupled to the housing, the second extrusion mechanism having a second motor operably coupled to a second filament engagement mechanism: a second filament holder having a second filament disposed thereon, the second filament holder being operably coupled to the housing and arranged to transfer the second filament to the second extrusion mechanism; and wherein the housing has a second inlet and a second outlet, the second extrusion mechanism being positioned adjacent the second inlet.

In addition to one or more of the features described herein, or as an alternative, further embodiments of the system may include a second three-dimensional drawing device separate from the base station and sized to be held by a single user, the second drawing device defining a second pathway that receives the second filament from the second outlet and transfers the second filament to a second heated section, the second drawing device having a nozzle removably coupled to the second heated section to receive the second filament. In addition to one or more of the features described herein, or as an alternative, further embodiments of the system may include the first three-dimension drawing device further having a second pathway that receives the second filament from the second outlet and transfers the second filament to the first heated section.

In addition to one or more of the features described herein, or as an alternative, further embodiments of the system may include the first filament having a first property and the second filament has a second property, the second property being different than the first property. In addition to one or more of the features described herein, or as an alternative, further embodiments of the system may include the first property being a first color and the second property is a second color. In addition to one or more of the features described herein, or as an alternative, further embodiments of the system may include the first property being a first material type and the second property is a second material type.

In addition to one or more of the features described herein, or as an alternative, further embodiments of the system may include the first filament being identical to the second filament.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 7A is a schematic side view of another embodiment of an extrusion mechanism contained in or on the base station in the load state;

FIG. 7B is a schematic side view of the mechanism shown in FIG. 7A in the filament loaded state;

The detailed description explains embodiments of the disclosure, together with advantages and features, by way of example with reference to the drawings.

DETAILED DESCRIPTION OF THE DISCLOSURE

Embodiments of the present disclosure provide for a three-dimensional (3D) printing system having a handheld portion that is operably coupled to a base station that provide advantages in allowing the user to easily generate ad hoc or predetermined shapes. Further embodiments provide advantages in having a handheld portion that is sized, shaped, and/or weighted to allow the user to easily control and dispense filament to form a desired shape. Still further embodiments provide advantages in allowing for accessory devices for modifying the generated 3D printed shape.

Figure 1:
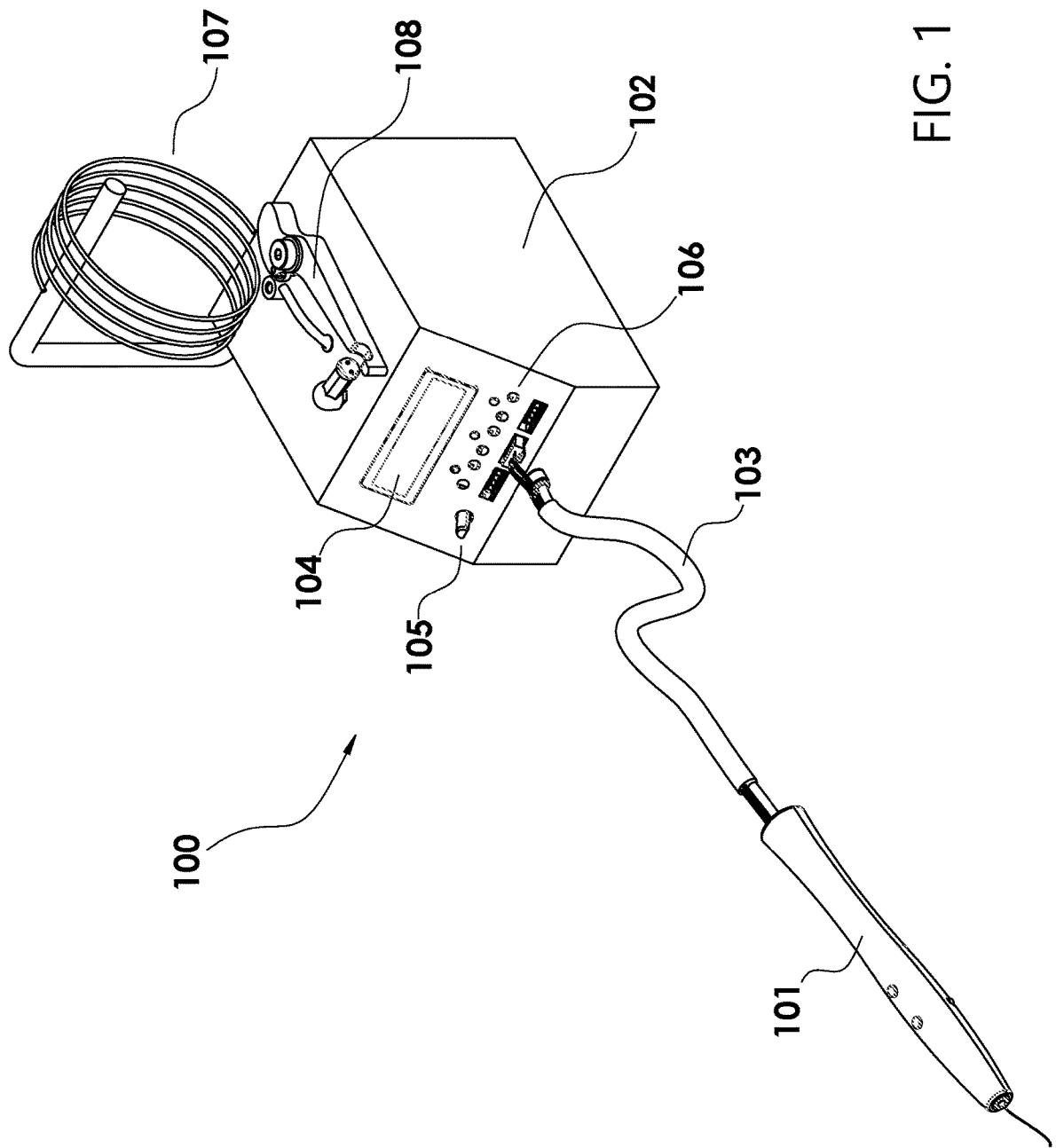
FIG. 1 is a front perspective view of an exemplifying base station and handheld extrusion device in accordance with aspects of the present disclosure.

FIG. 1 illustrates an exemplifying base station with connected handheld extrusion device 100 for planar or 3D drawing by a user holding and guiding the extrusion device 101 with one hand. The extrusion device 101 is coupled to the base station 102 by means of a flexible cable 103 which contains electrical conductors and a filament guide tube of the correct inner diameter (ID). A user interacts and adjusts the system by means of a user interface having a screen 104, control knob 105, and actuators/buttons 106. Filament 107 is pushed or pulled through the system by means of an extrusion mechanism 108 mounted on the top of the base station 102.

Figure 2:
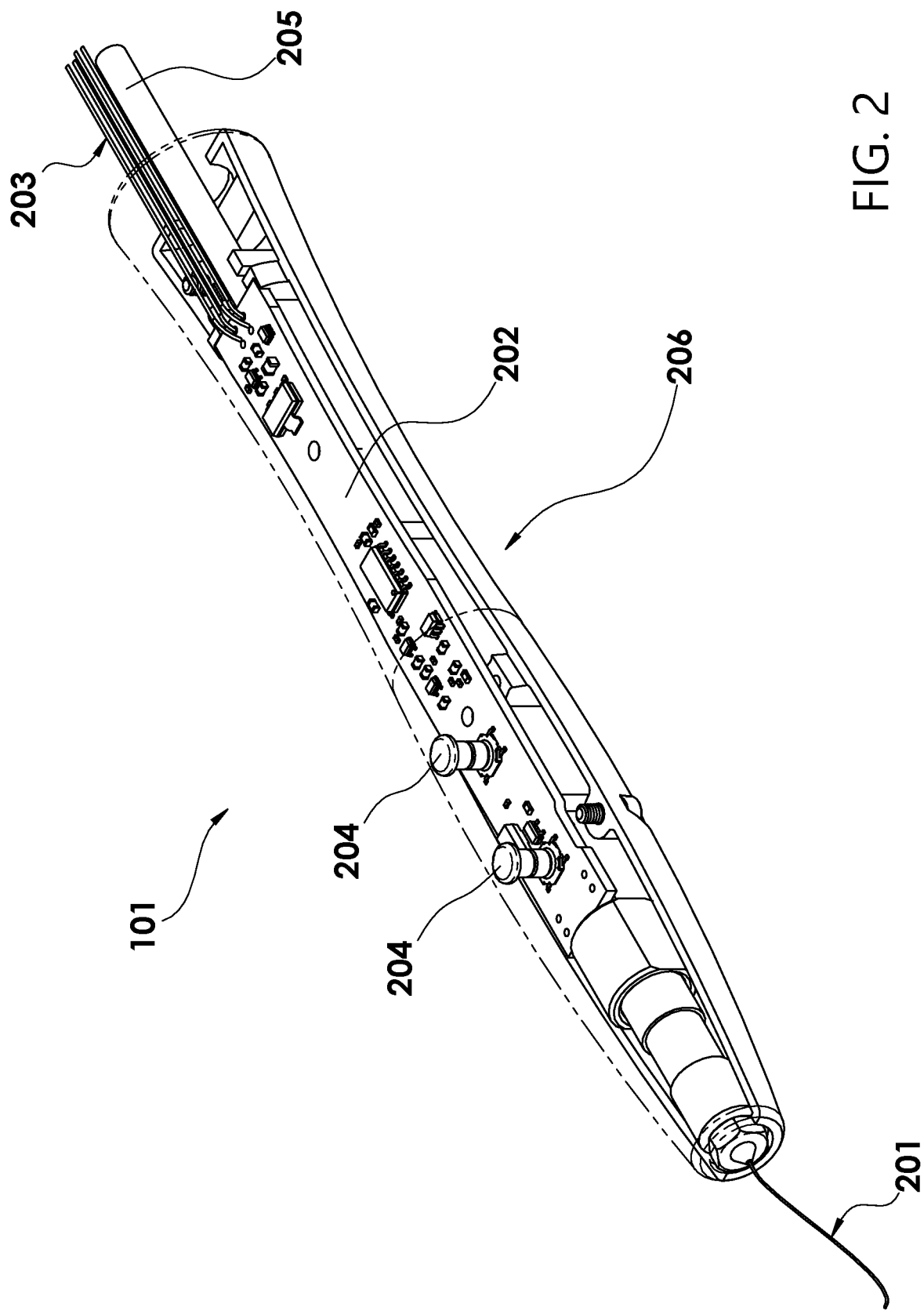
FIG. 2 is a front perspective view of a streamlined handheld extrusion device with the top cover of the device made transparent.
Figure 3:
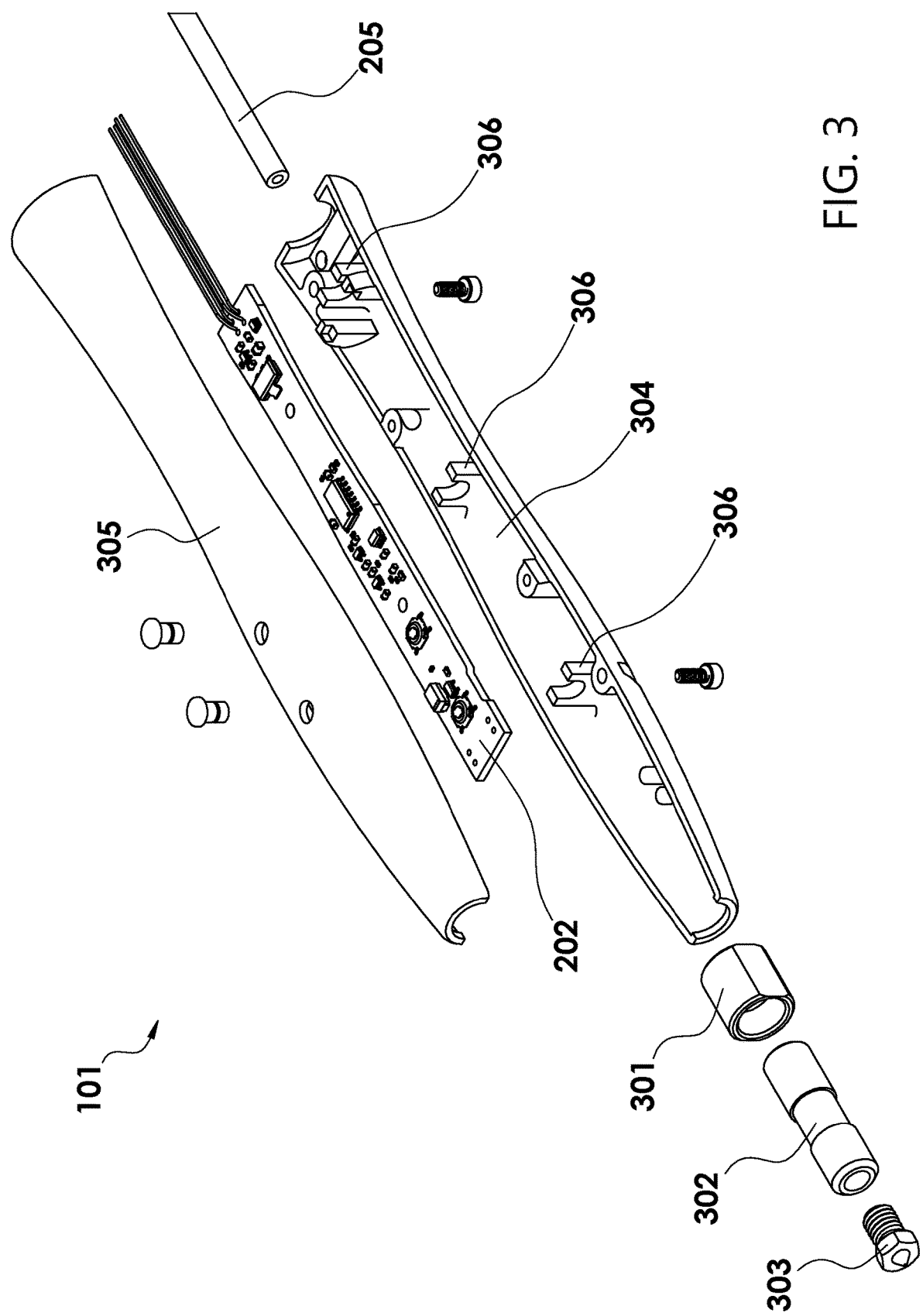
FIG. 3 is an unassembled perspective view of FIG. 2.

Referring now to FIGS. 2-3, close up views of an extrusion device 101 are shown having an elongated body 206. In an embodiment, the body 206 can be shaped as a handheld pen and guided by the user's hand to extrude molten filament 201 in three dimensions. In an embodiment, the body 206 includes a curved outer surface. The extrusion device 101 includes an extrusion device printed circuit board 202 disposed within the body 206 which is connected to the base station 102 by means of electrical conductors 203 and has user accessible actuators/buttons 204 mounted upon it. The extrusion device 101 has a filament guide tube 205 which runs the length of the extrusion device 101, from the hot end coupler 301 (FIG. 3) to the base station 102. It should be appreciated that by moving some of the components to the base station 102, the handheld extrusion device may be sized and shaped to be comfortable in a user's hand.

FIG. 3 illustrates an unassembled view of the extrusion device 101. The filament guide tube 205 routes through retention features 306 built into the lower housing 304 and underneath or adjacent to the extrusion device printed circuit board 202. The filament guide tube 205 is coupled to the hotend coupler 301, which in turn is coupled to the melt chamber 302. In this embodiment, a nozzle 303 is removably coupled into the melt chamber 302. In an embodiment, the nozzle 303 includes threads that cooperate with threads on the melt chamber 302 to couple the nozzle 303 to the melt chamber 302. Other embodiments may have a nozzle 303 permanently coupled to the melt chamber 302. Filament 107 is pushed from the base station 102, through the filament guide tube 205 (i.e. by the extrusion mechanism 108), to the melt chamber 302, where the filament 107 is heated to its glass transition temperature and then extruded through a small diameter orifice in the nozzle 303. The melt chamber 302 can be heated by resistive wire running from the extrusion device printed circuit board 202 using techniques known by those skilled in the art.

Figure 4:
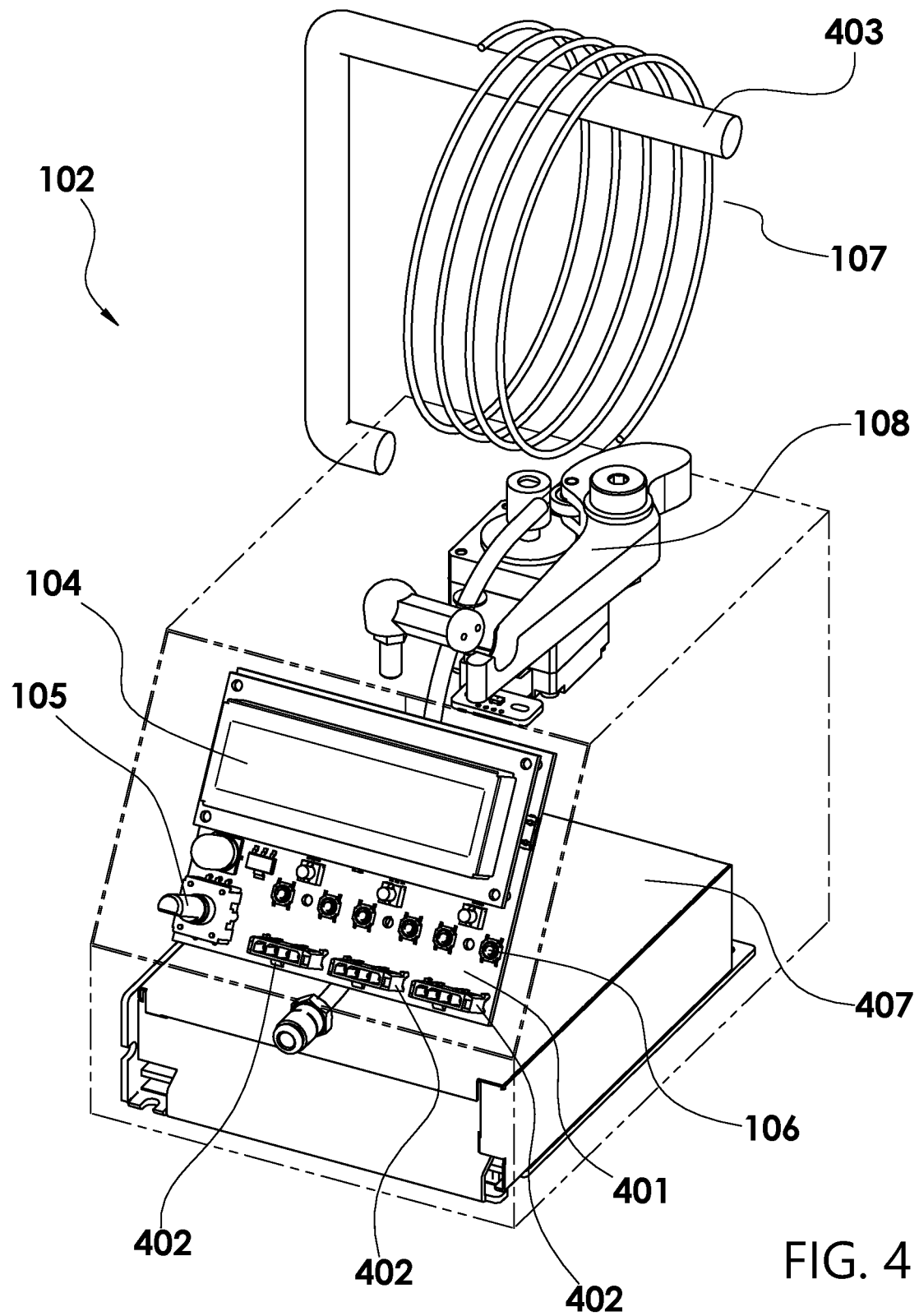
FIG. 4 is a front perspective view of a base station with the outer enclosure of the device illustrated as being transparent.
Figure 5:
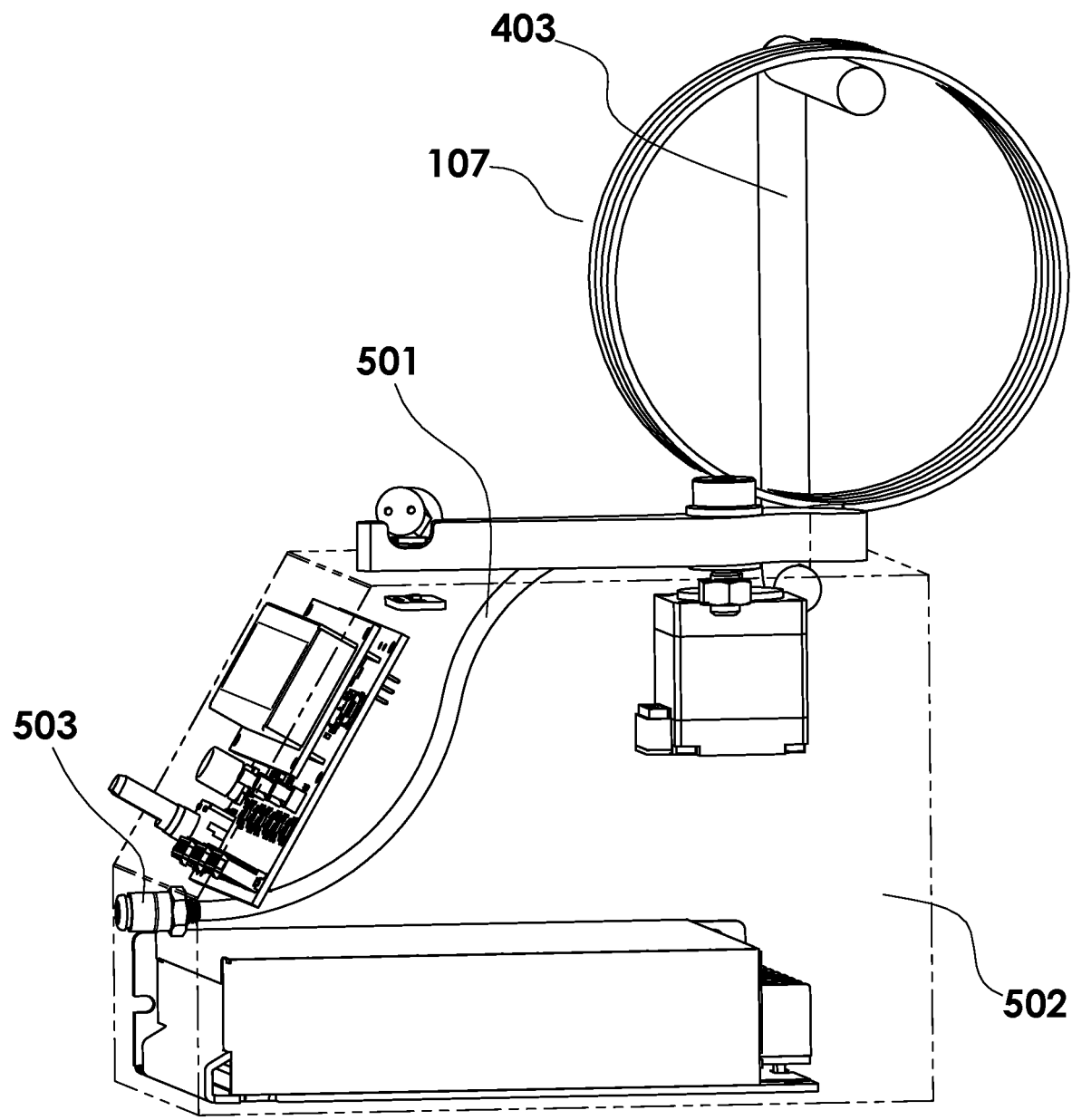
FIG. 5 is a side perspective view of a base station with the outer enclosure of the device illustrated as being transparent.

FIGS. 4-5 show front and side perspective views of a base station 102. The base station printed circuit board 401 contains a user interface having a screen 104, control knob 105, actuators/buttons 106, and user accessible electrical connectors 402. An electrical power supply 407 converts AC electricity to DC, which is then supplied to the base station printed circuit board 401. The extrusion mechanism 108 pushes and pulls filament 107 that hangs on a filament holder 403 through the entire system 100.

FIG. 5 is a side perspective view of a base station 102. The filament 107 enters the base station filament guide tube 501 which enters/penetrates the base station enclosure 502 and routes internally to a user accessible port 503. The filament guide tube 205 (FIG. 3) couples or plugs into the outer side of the user accessible port 503. When guide tubes 205, 501 are connected to the user accessible port 503, a pathway is created for the filament 107 to travel from the filament holder 403 to the extrusion device 101.

Figure 6A:
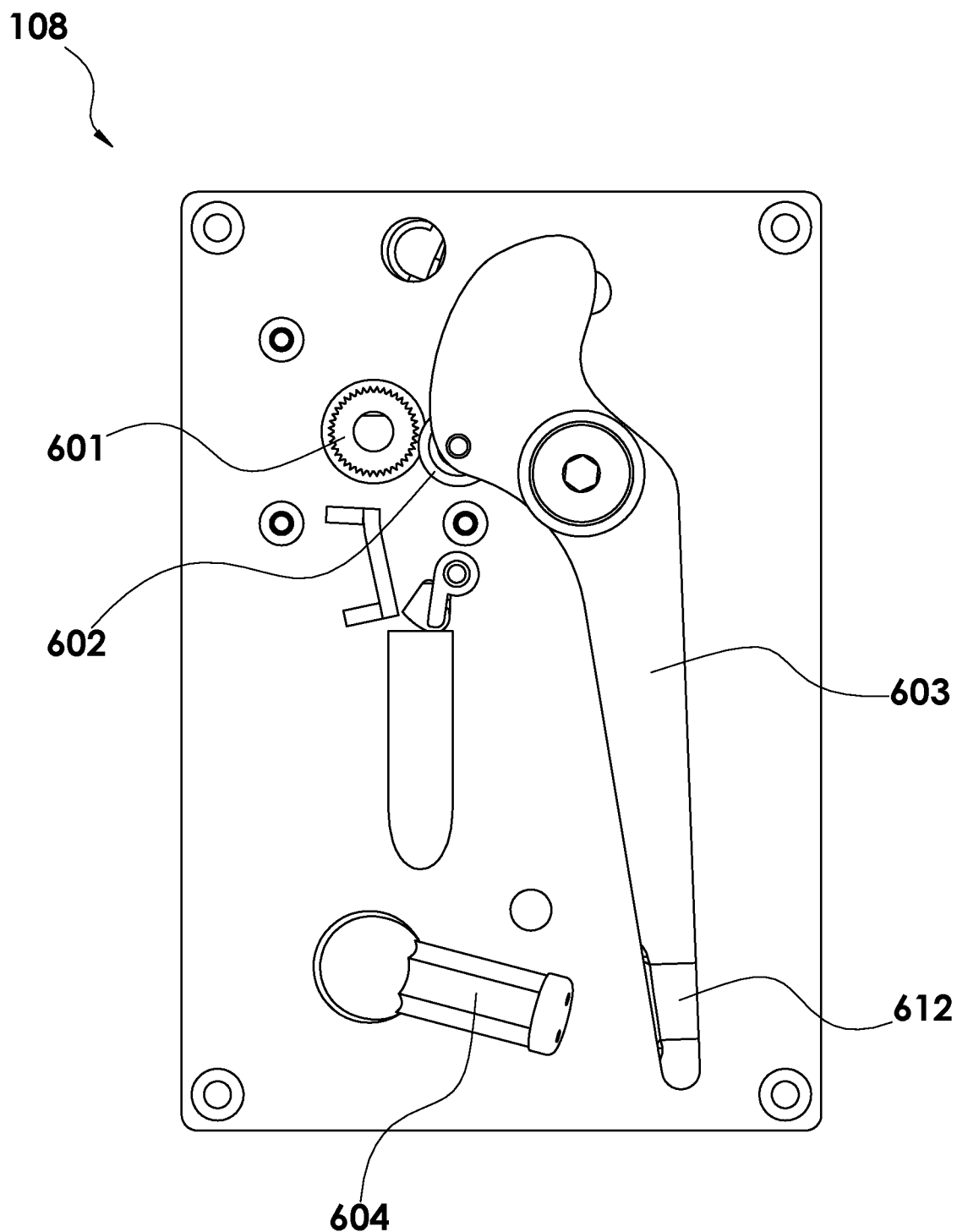
FIG. 6A is a top view of an exemplary extrusion mechanism which is mounted on top of the base station in an idle state.

Referring now to FIG. 6A-6F, an embodiment is shown of the operation of an embodiment of an extrusion mechanism 108 located on or within the base station 102. FIG. 6A is a top view of the mechanism in the idle state (i.e. not being used) and displays the filament-engagement member 601, idler wheel 602, engagement handle 603, and locking member 604 in rest positions. In an embodiment, the filament-engagement member 601 includes an outer diameter having a surface configured to engage the filament and move the filament through the extrusion mechanism 108. In an embodiment, the outer diameter is a knurled surface.

Figure 6B:
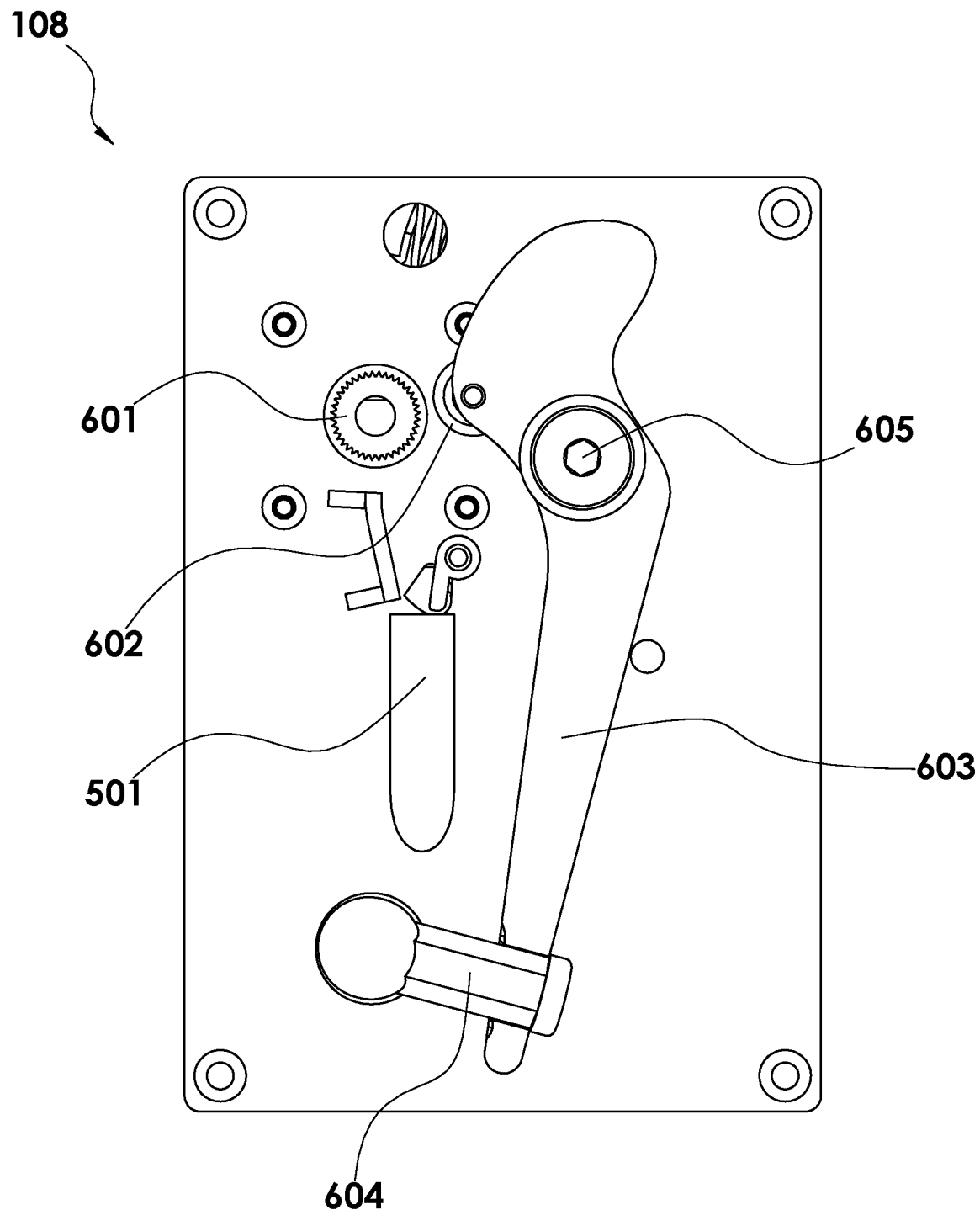
FIG. 6B is a top view of a load state of the mechanism shown in FIG. 6A.

FIG. 6B is a top view of the extrusion mechanism 108 in the user open state. In the open state, the user has rotated the engagement handle 603 about the handle axle 605 and locked the mechanism open by coupling the locking member 604 with receiving features 612 on the engagement handle 603. Locking the extrusion mechanism 108 open provides clearance between the filament-engagement member 601 and idler wheel 602, so that the user can easily load filament 107 into the base station filament guide tube 501 and align it with the filament-engagement member 601. In other words, when in the open position, the gap between the filament-engagement member 601 and the idler wheel 602 is larger than the diameter of the filament.

Figure 6C:
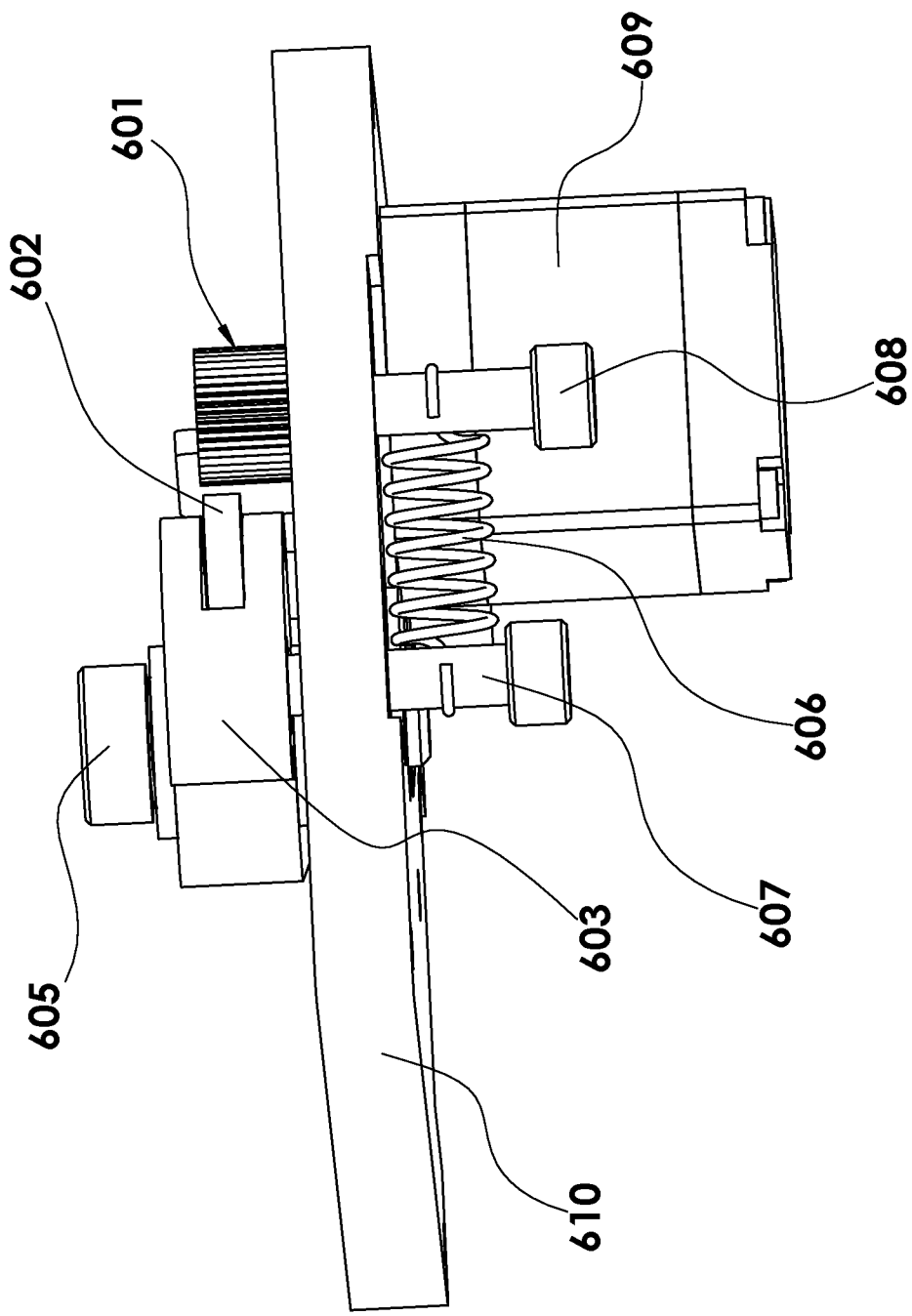
FIG. 6C is a rear perspective view of the extrusion mechanism of FIG. 6A.

Referring to FIG. 6C, a rear perspective view of the extrusion mechanism of FIG. 6B is shown which allows viewing a biasing member, such as motive spring 606 for example, is coupled to a moving post 607 and a stationary post 608. The moving post 607 is attached to the engagement handle 603 and is constrained by a slot made through the extrusion mechanism baseplate 610, while the stationary post 608 is attached to the extrusion mechanism baseplate 610. The motive spring 606 provides a biasing force which pulls the moving post 607 towards the stationary post 608, and that in turn pulls the engagement handle 603 and idler wheel 602 towards the filament-engagement member 601. The engagement handle 603 is configured to create a mechanical advantage for the user, reducing the force required for the user to overcome the biasing force of motive spring 606 when locking the extrusion mechanism 108 in the open position. In this embodiment a stepper motor 609 is shown mounted underneath the filament-engagement member 601, which is coupled to the shaft of the motor 609. The stepper motor 609 allows for electronic control of driving the filament-engagement member 601 either clockwise or counterclockwise. Other embodiments may utilize a different type of motor, for example a brushless DC or DC gearhead motor.

It should be appreciated that the use of a stepper motor and the position of the extrusion mechanism in the base station provides advantages over 3D Pens of the prior art that positioned the extrusion mechanism in the handheld portion of the system in that the stepper motor, which is too large to be positioned within the handheld extruder allows for effective and efficient movement of the filament in both directions. As such the system disclosed herein allows the user to have greater control over the material being deposited by the handheld device and undesired dripping of the melted filament is reduced or eliminated.

Figure 6D:
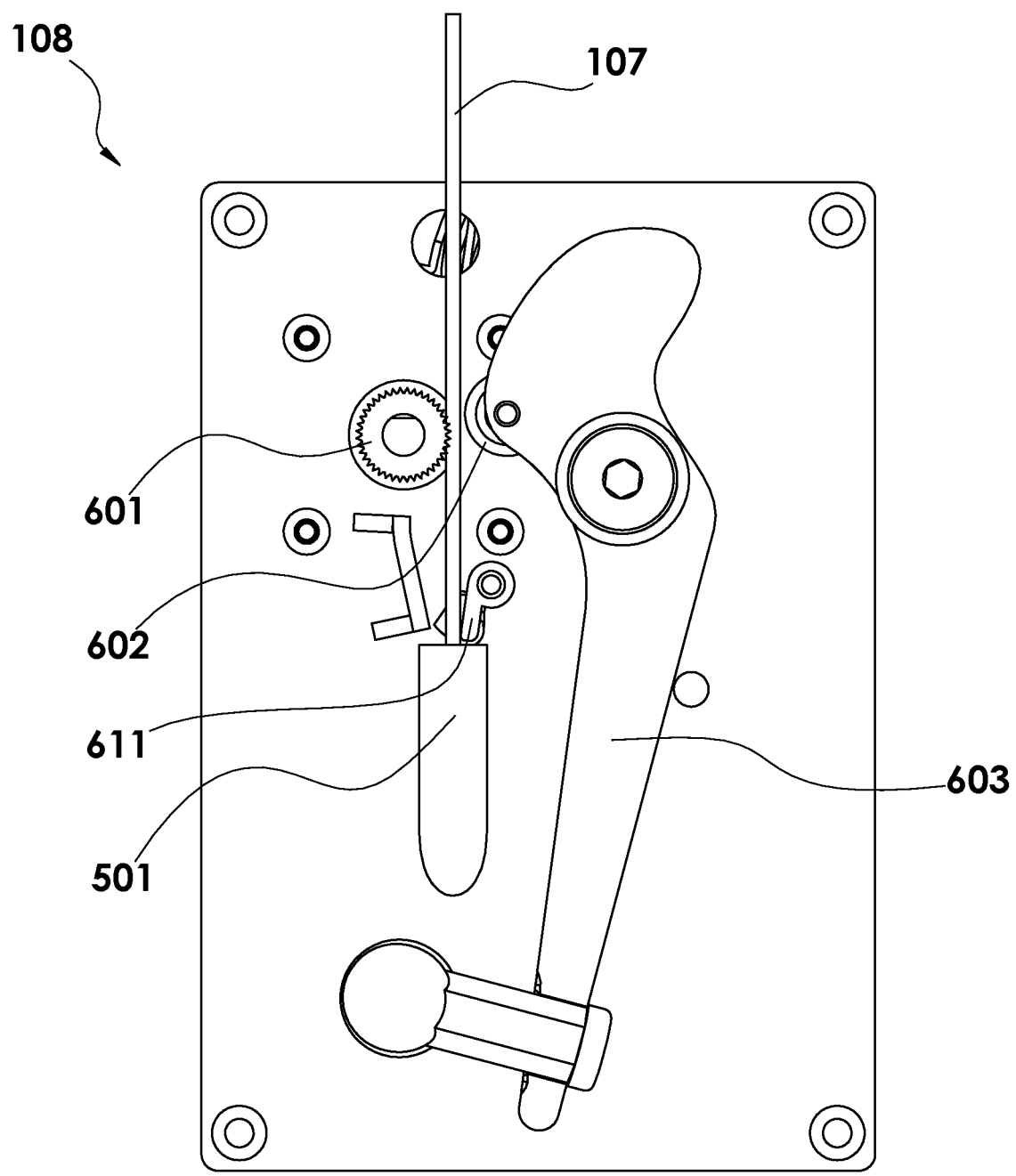
FIG. 6D is a top view of the mechanism in the load state, with filament inserted, of the mechanism shown in FIG. 6A.

Referring to FIG. 6D a top view of the extrusion mechanism 108 is shown in the filament inserted state, where the user has inserted the filament 107 into the base station filament guide tube 501 and aligned it with the filament-engagement member 601. As part of inserting the filament 107 into the base station filament guide tube 501, the filament will push aside the filament gate 611, and this physical motion can be used to toggle an electronic sensor to indicate successful insertion of the filament. The engagement handle 603 is still locked open, meaning that the motive spring 606 is being prevented from pulling the idler wheel 602 into contact with the filament 107.

Figure 6E:
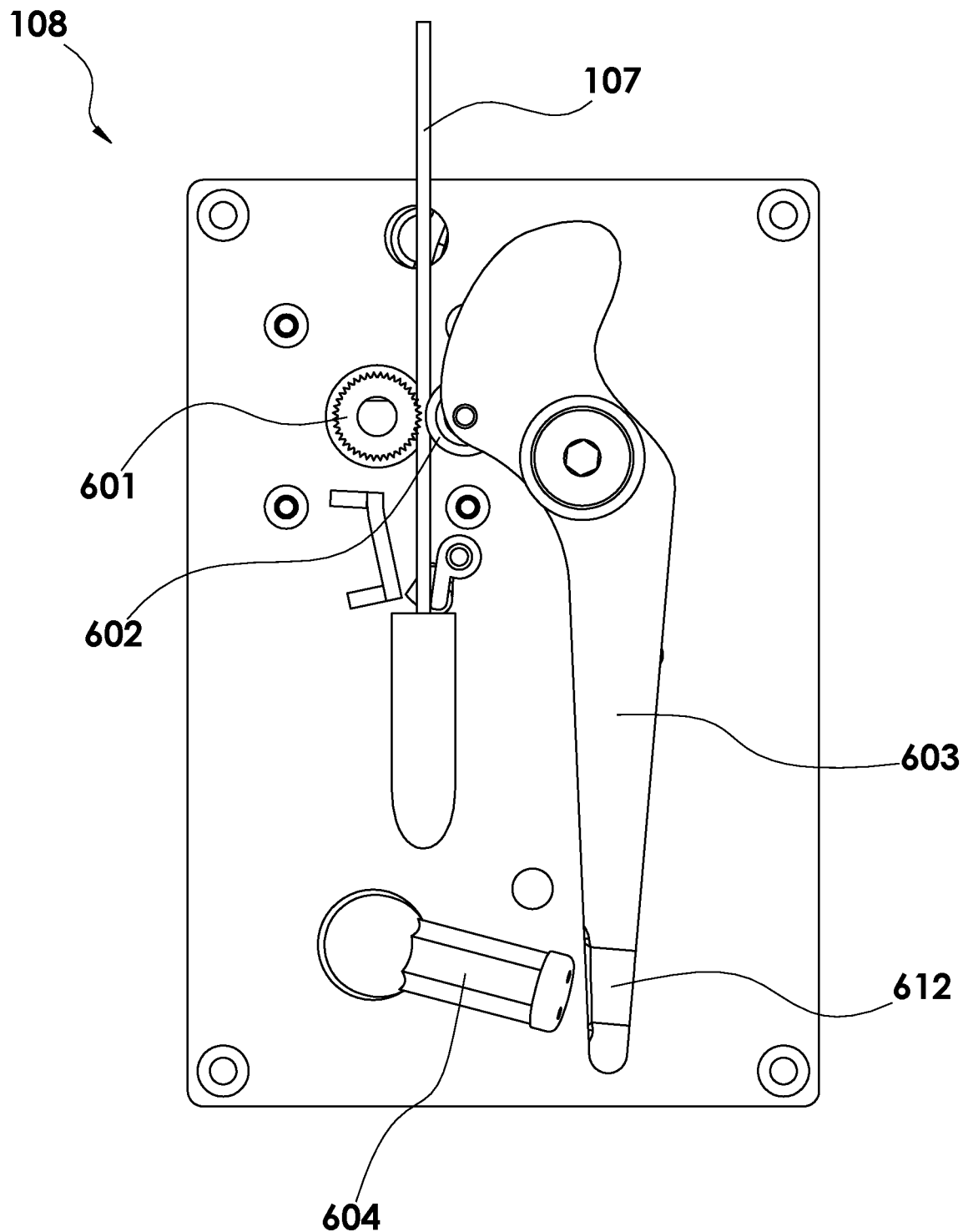
FIG. 6E is the filament loaded state of the mechanism shown in FIG. 6A.

A top view of the extrusion mechanism 108 is shown in FIG. 6E in the filament engaged state, where the user has decoupled the locking member 604 from the receiving features 612 on the engagement handle 603. This decoupling allows the motive spring 606 to pull the idler wheel 602 into contact with the filament 107. The idler wheel 602 transfers the force generated by the motive spring 606 to the filament 107, which in turn transfers the force to the filament-engagement member 601. The filament-engagement member 601 exerts a substantially equal and opposite force upon the filament 107, resulting in the filament being pinched between the filament-engagement member 601 and the idler wheel 602. With the filament 107 in intimate contact with the filament-engagement member 601, when the motor 609 is electronically activated and turned either clockwise or counterclockwise, the filament 107 will be driven tangent to the corresponding rotational direction. In order to provide a desired movement of the filament 107, the force generated by the motive spring 606 may be selected using techniques familiar to those skilled in the art.

Figure 6F:
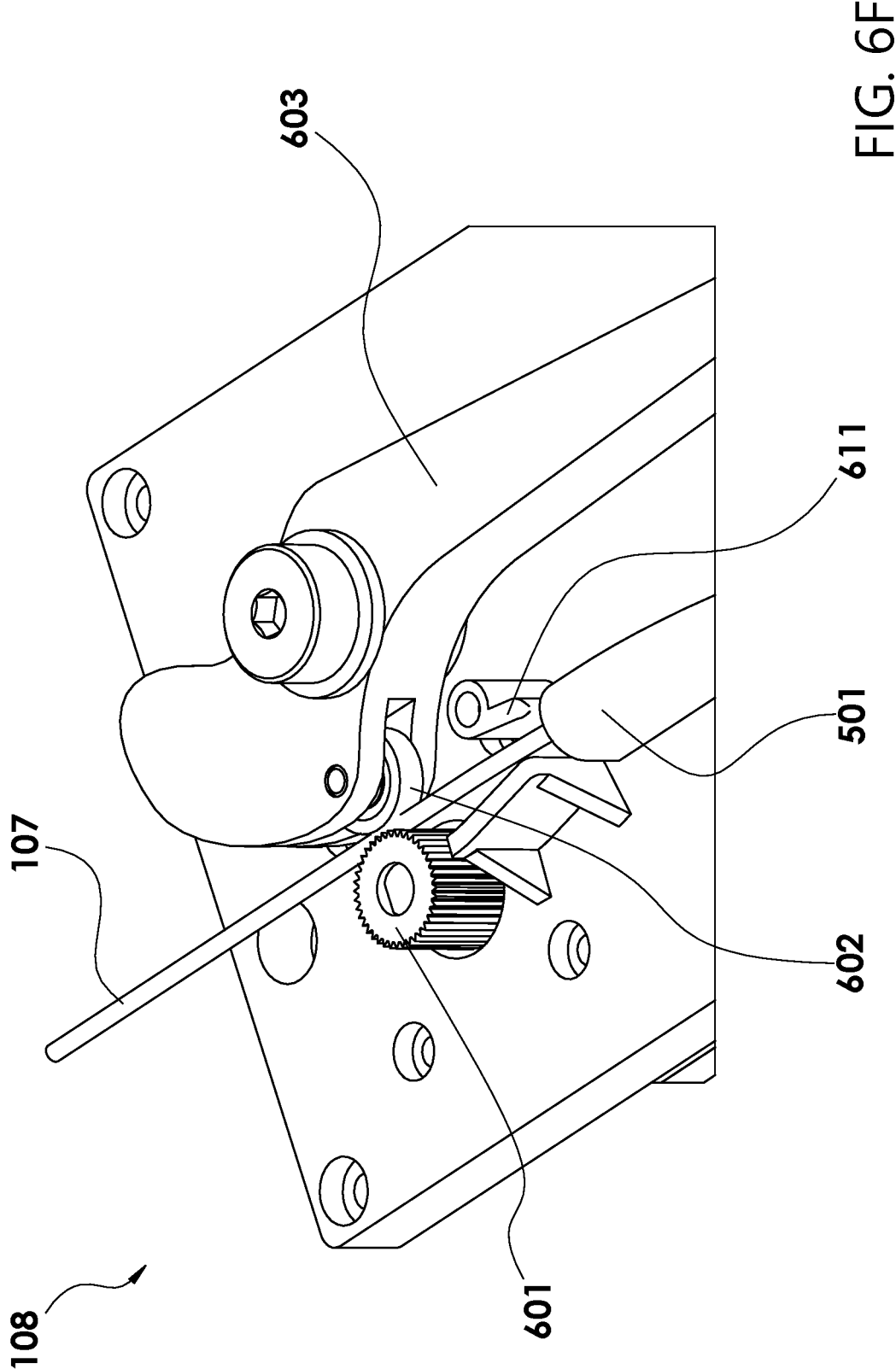
FIG. 6F is an enlarged front perspective view of the extrusion mechanism of FIG. 6A.

A closeup perspective view of the extrusion mechanism 108 is shown in FIG. 6F in the filament engaged state. In this position, the mounting of the idler wheel 602 within the engagement handle 603 is more clearly shown. This also provides another viewing angle of the base station filament guide tube 501 and the filament gate 611.

FIG. 7A-7B show a side view of an alternate embodiment of an extrusion mechanism that is based around a vertically activated lever. FIG. 7A shows extrusion mechanism locked open by the user. A vertical lever 701 is toggled downward by application of a small force by the user, which overcomes the downward force of a biasing member, such as a main vertical spring 702. The lever 701 pivots around a fixed pivot point 705 which also allows for the user to gain mechanical advantage over the main vertical spring 702. The user then couples a locking latch 703 with retention features 704 built into the vertical lever 701 to lock the mechanism open.

An idler wheel 602 is mounted on the vertical lever 701 and when the lever is raised it creates a gap between the idler wheel and the filament-engagement member 601, to allow the user to insert filament 107 into the mechanism. A flag 706 mounted on the vertical lever 701 is also raised out of the path of a sensor 707 and this change of sensor state can be monitored electronically.

FIG. 7B shows the mechanism of FIG. 7A in a filament engaged state. The user has disengaged the locking latch 703 and the main vertical spring 702 pulls the idler wheel 602 into contact with the filament 107. This engagement of the filament 107 is similar to what is shown in FIG. 6E. A weaker vertical spring 709 limits the speed and force with which the vertical lever 701 can snap back once the locking latch 703 is disengaged. A physical hard stop 708 prevents the mechanism from over-travelling.

Figure 8:
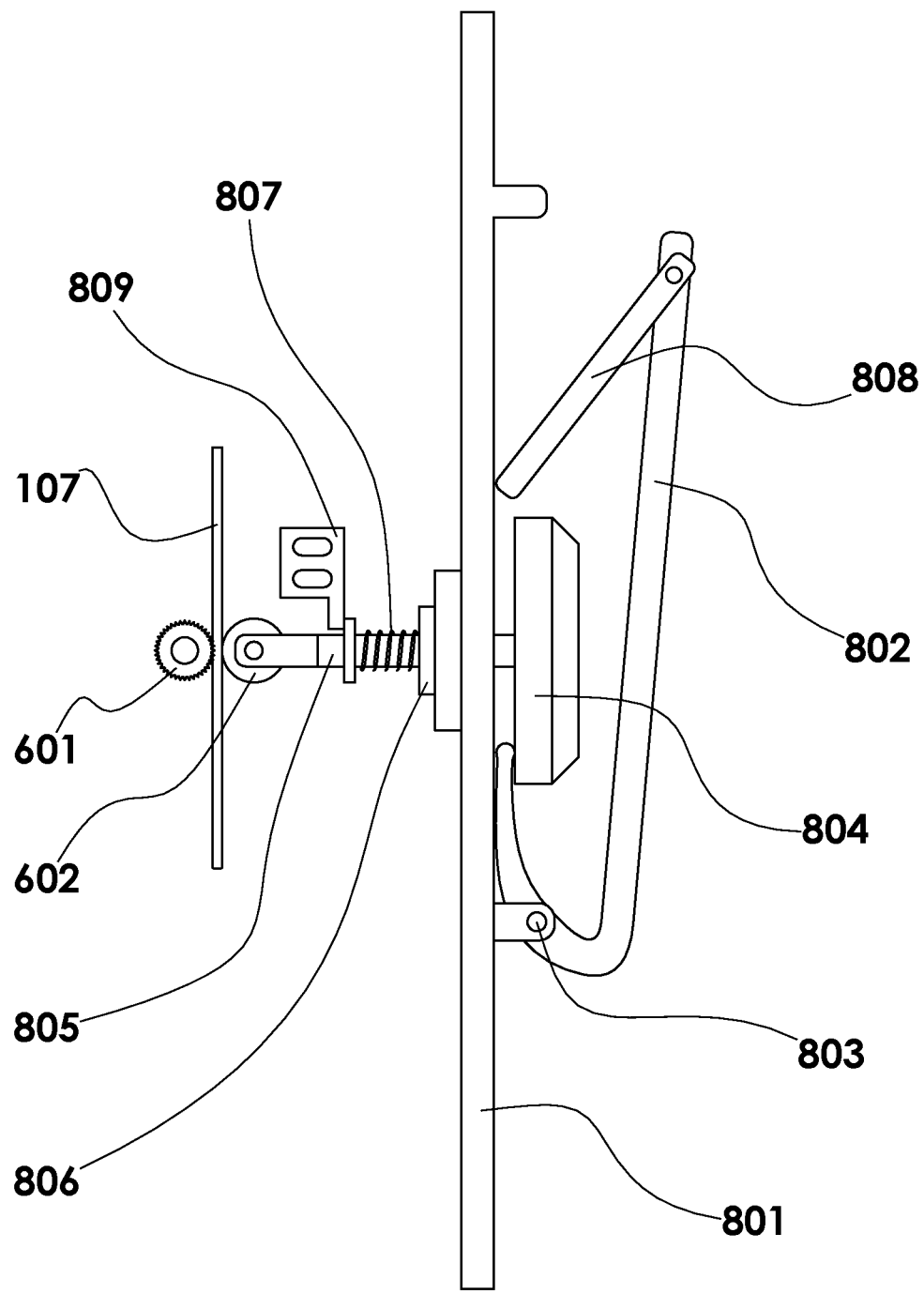
FIG. 8 is a schematic top view of another embodiment of an extrusion mechanism contained in or on the base station with mechanism in the filament loaded state.

FIG. 8 shows a top view of another alternate embodiment of an extrusion mechanism that enters/penetrates the side wall of a base station enclosure 801. This mechanism is shown in the filament engaged state. To operate the mechanism the user pulls on a mechanically advantaged curved lever 802 which pivots about axis 803. As it pivots, the curved lever 802 will push the plunger cap 804 away from the side wall of the base station enclosure 801. This in turn withdraws the plunger arm 805 through a bushing 806 and compresses a biasing member, such as a plunger spring 807. The user can then lock the mechanism open for loading by pivoting the kickstand 808 into place. An adjustable physical hard stop 809 prevents the mechanism from over-travelling.

Figure 9:
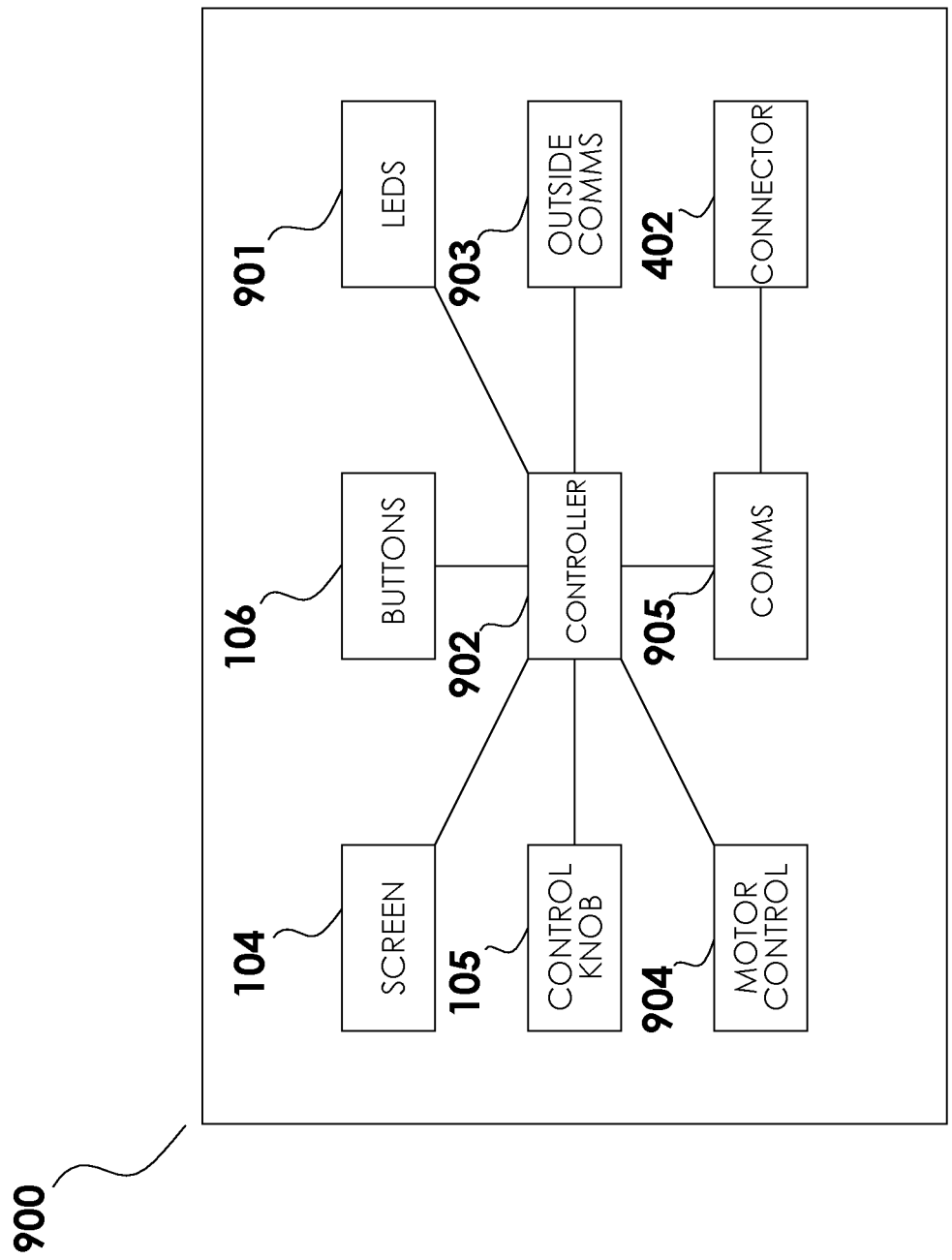
FIG. 9 is a control block diagram of an exemplifying three-dimensional drawing system in accordance with aspects of the present disclosure.

FIG. 9 illustrates an embodiment of an electronics control block diagram 900 for a base station 102. A central controller 902 is capable of providing feedback to a user via a screen 104 and LEDs 901. System control parameters are manipulated by a control knob 105 and actuators/buttons 106 (FIG. 1) electrically connected to the central controller 902. Control parameters and feedback may also be displayed or manipulated through an outside communications port 903 (for example a Universal Serial Bus or USB port). Communications 905 between a connected handheld extrusion device (e.g. extrusion device 101) and/or accessories and a base station allow for manipulation and feedback through electrical connectors 402 (one is shown for clarity). The interfaces plus communications ports allow for reprogrammable functionality and flexibility. Additional connected devices can electronically describe their behavior to the central controller 902, which can then provide an appropriate user interface for said device. Extruder motor 609 control and sensing 904 allows for the control of extruder motor 609 position, velocity, and acceleration. Sensing for filament 107 and engagement handle 603 position can also be processed by the central controller 902.

Figure 10:
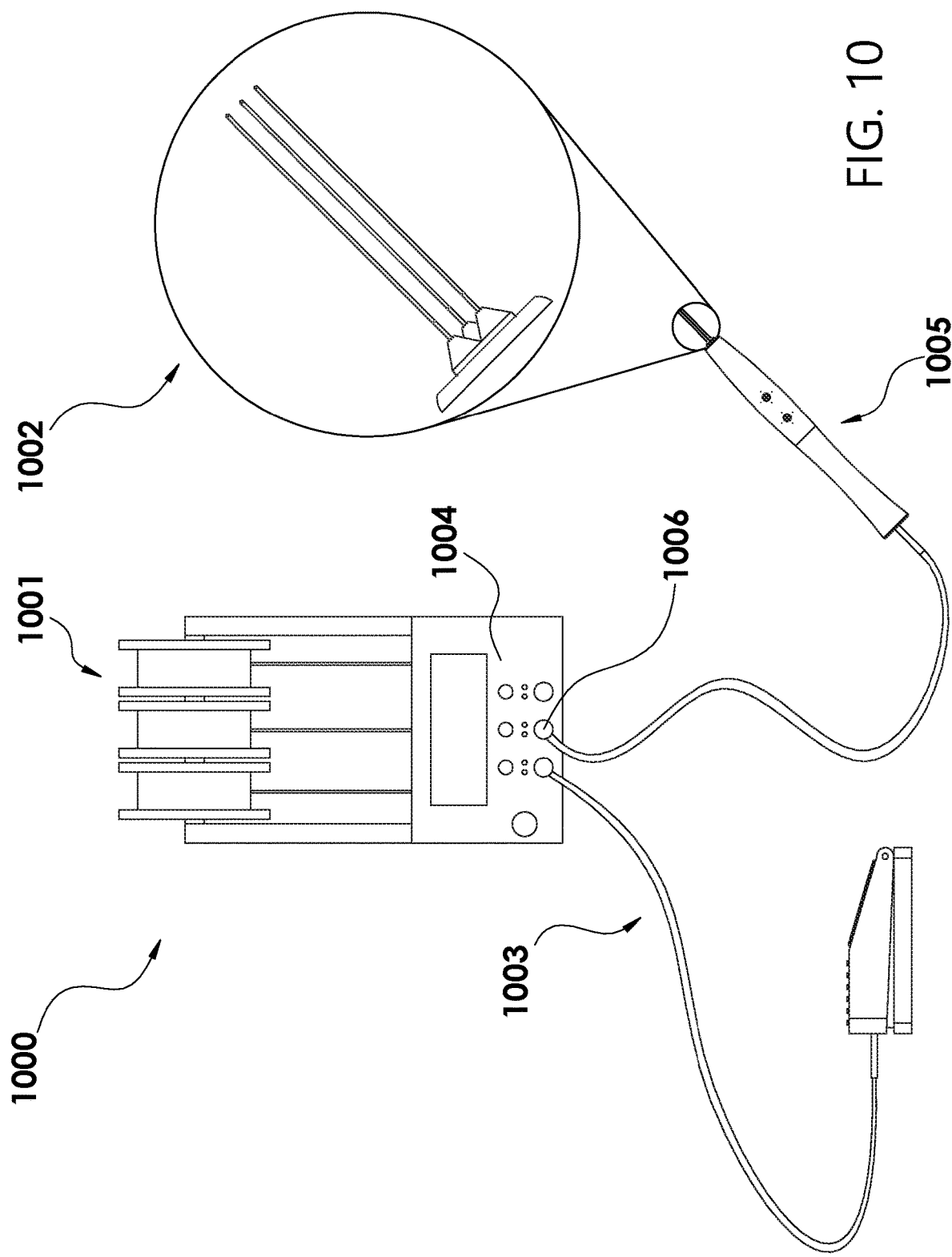
FIG. 10 is a schematic front perspective view of a multi color base station.

FIG. 10 illustrates an embodiment of a base station 1000 that allows for the user to dispense multiple filaments, such as filaments having multiple colors. The multi-color base station 1000 includes multiple nozzles 1002 on a connected extrusion device 1005. A multi-color base station 1000 would allow for the use of multiple filament sources 1001 operating in parallel fashion. Direct electrical connections to accessories 1003 and a human manipulable interface 1004 allows for the manipulation of extruded plastic. An alternate embodiment of a multi-color base station 1000 would have the multiple filament sources 1001 being routed to a plurality of paired electrical and tubing connectors 1006. Multiple single filament extrusion devices 101 would then be connected to distinct electrical and tubing connectors 1006 in a 1:1 fashion. This embodiment more directly mirrors the current practice by those skilled in the art of using multiple conventional single filament extrusion devices to quickly extrude different filament 107 colors.

It should be appreciated that while embodiments herein describe the base station 1000 as having multiple colors, this is for example purposes and the claims should not be so limited. In other embodiments, the base station 1000 may have multiple filaments each having different properties, such as mechanical properties for example. In still further embodiments, the base station 1000 may hold multiple filaments that are identical to each other. It should be appreciated that this allows for extra capacity, such as in a manufacturing environment for example.

Figure 11A:
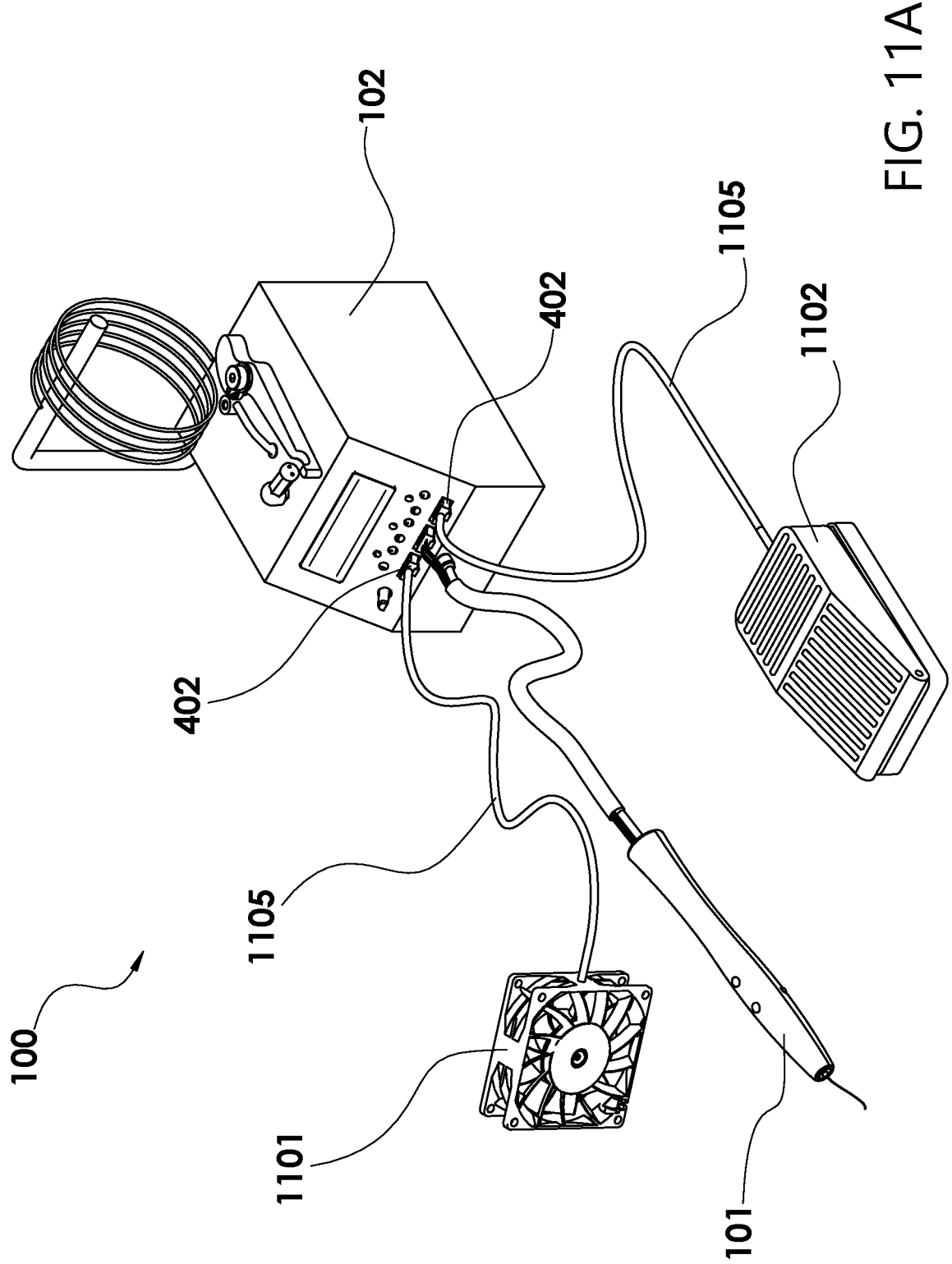
FIG. 11A is a front perspective view of an exemplifying base station with a handheld extrusion device, and two accessories connected (cooling fan and foot pedal)
Figure 11B:
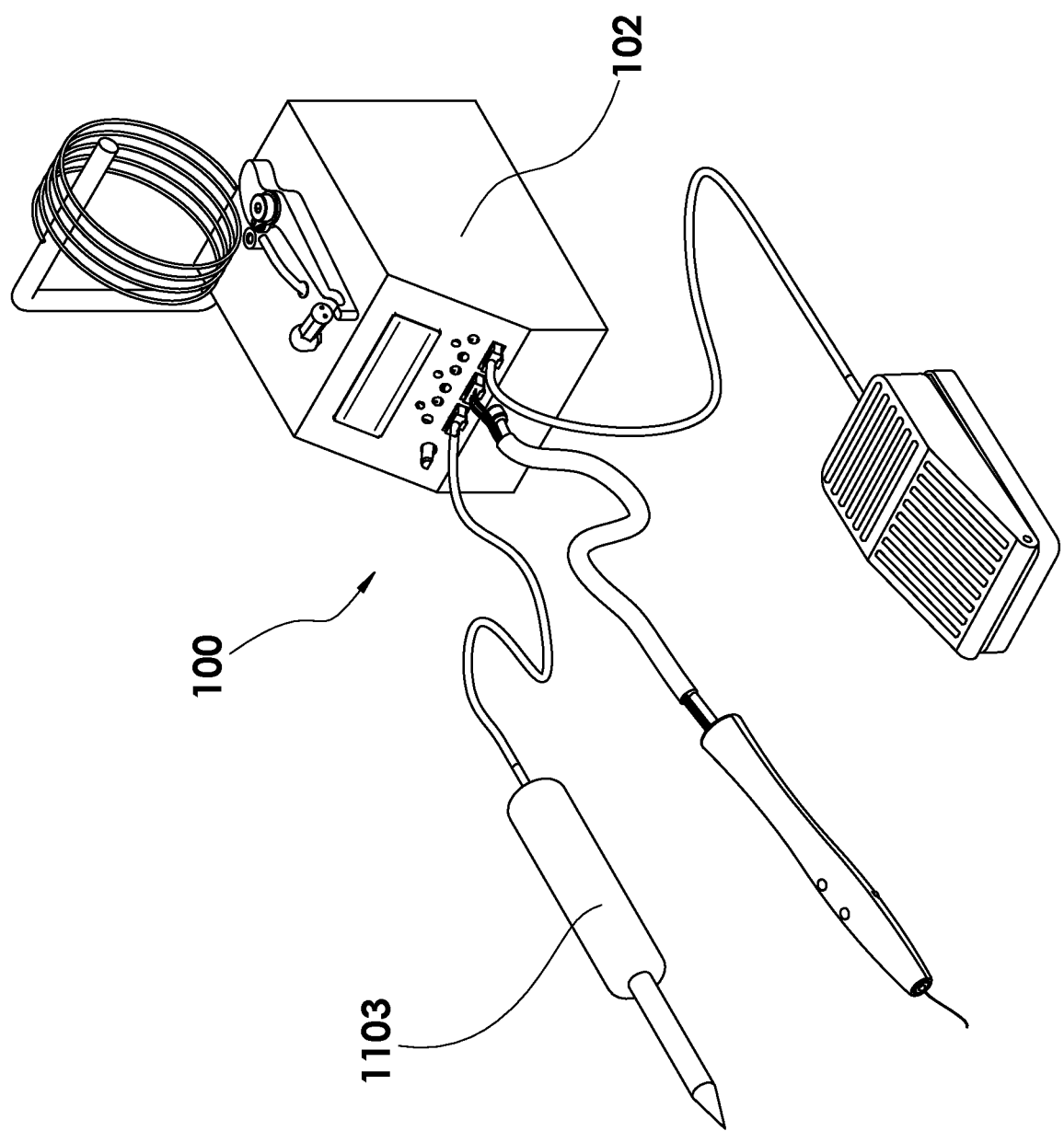
FIG. 11B is the base station shown in FIG. 6A with one different accessory shown (smoothing tool)
Figure 11C:
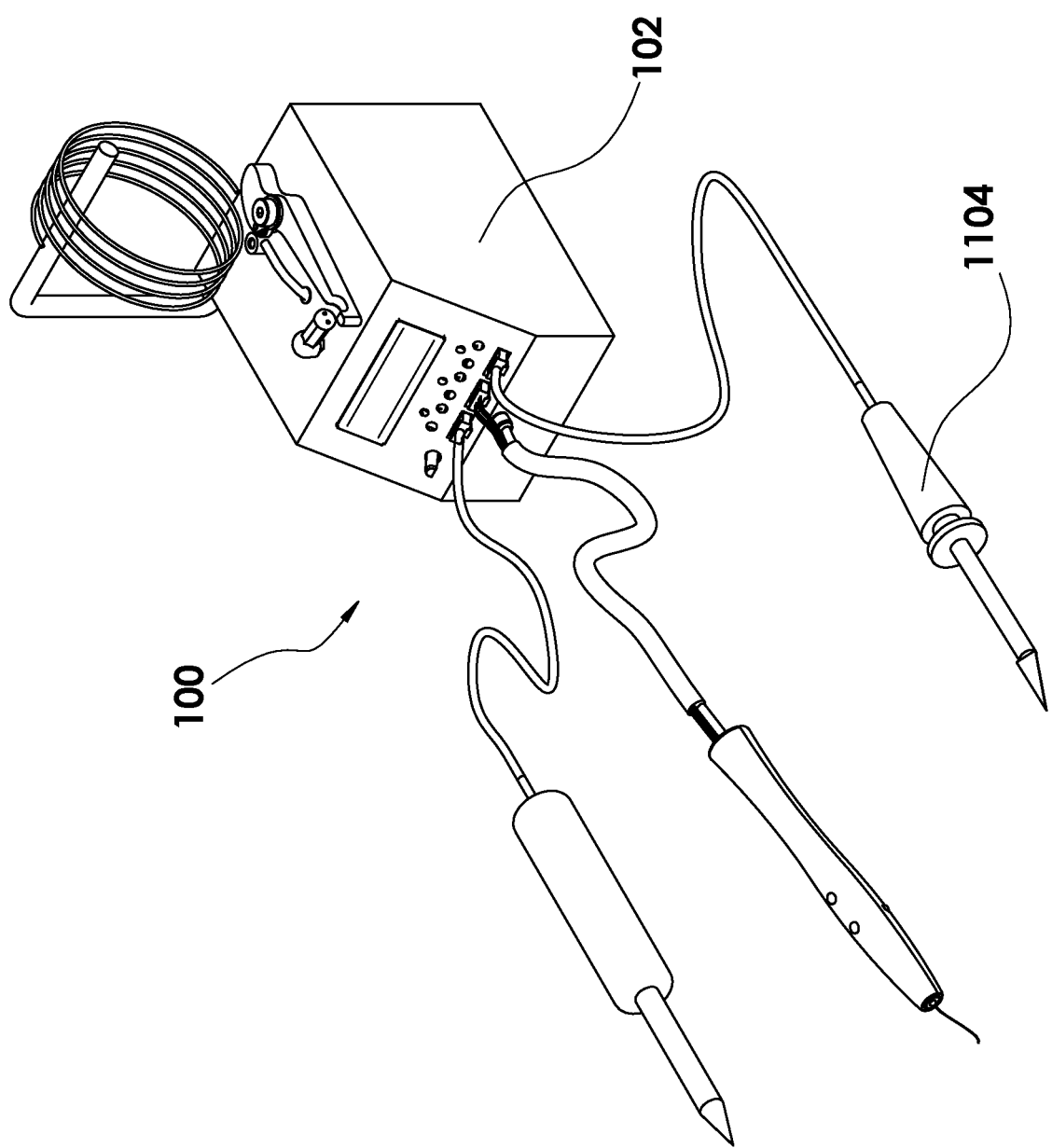
FIG. 11C is the base station shown in FIG. 6A with one different accessory shown (hot knife).

Referring now to FIGS. 11A-11C an embodiment is shown of an exemplifying base station 102 with connected handheld extrusion device 101 used in conjunction with various accessories that have also been connected to the base station 102. In the embodiment of FIG. 11A the two example accessories connected are a cooling fan 1101 and a foot pedal 1102. They are connected to the base station 102 by means of a flexible electrical cable 1105 which connects/plugs into one of the user accessible electrical connectors 402. In one embodiment the foot pedal 1102 can be used to control the extrusion and retraction of filament from an extrusion device 101. FIG. 11B has one different accessory connected to the base station 102 and that is a temperature controlled tool for smoothing 1103 extruded layers of plastic. FIG. 11C has another accessory connected to the base station 102 and that is a temperature controlled hot knife tool 1103 for cutting extruded layers of plastic. It should be appreciated that the accessories shown in FIGS. 11A-11C are for example purposes and the claims should not be so limited. In other embodiments, other accessories or numbers of accessories may be used.

The term "about" is intended to include the degree of error associated with measurement of the particular quantity based upon the equipment available at the time of filing the application. For example, "about" can include a range of ±8% or 5%, or 2% of a given value.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection." It should also be noted that the terms "first", "second", "third", "upper", "lower", and the like may be used herein to modify various elements. These modifiers do not imply a spatial, sequential, or hierarchical order to the modified elements unless specifically stated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A system comprising:
   a base station having a housing with an inlet and an outlet;
   a Bowden style mechanism coupled to the housing upstream of the inlet, the Bowden style mechanism having a motor operably coupled to a filament engagement mechanism;
   a filament holder having filament disposed thereon, the filament holder being coupled to the housing downstream to the Bowden style mechanism, and arranged to transfer the filament to the Bowden style mechanism;
   a three-dimensional drawing device separate from the base station and downstream from the outlet, and sized to be held by a single user, the drawing device defining a pathway that receives filament from the outlet and transfers the filament to a heated section, the drawing device having a nozzle removably coupled to the heated section to receive the filament, and the drawing device further having at least one actuator; and
   a controller having a processor, the controller being coupled to communicate with the motor, the heated section and the at least one actuator, the processor being responsive to executable computer instructions in response to an actuation of the at least one actuator for causing the motor to rotate in a first direction to move the filament through the inlet and outlet to the drawing device and to cause the heated section to at least partially melt the filament moving through the drawing device.

2. The system of claim 1, further comprising a tube operably coupling the outlet to the drawing device, wherein the tube at least partially defines the pathway.

3. The system of claim 1, wherein the processor is further responsive to cause the motor to rotate in a second direction in response to the actuation of the actuator being stopped, the second direction being the opposite of the first direction.

4. The system of claim 1, wherein the heated section includes a thermistor.

5. The system of claim 1, wherein the filament engagement mechanism includes:
   a filament engagement member configured to rotate and engage the filament;
   a idler wheel rotationally coupled to an engagement handle, the engagement handle being rotatable between an open position, inserted position, and an idle position; and
   wherein the idler wheel is positioned to push the filament against the filament engagement member when in the inserted position, and is spaced apart from the filament engagement member a distance sufficient for filament to pass freely therethrough when in the open position.

6. The system of claim 1, wherein base station includes a plurality of Bowden extrusion mechanisms, each of the Bowden extrusion mechanisms being configured to transfer filament to different three-dimensional drawing devices.

7. The system of claim 1, wherein the at least one actuator includes a scroll wheel, the controller and a user interface being responsive to movement of the scroll wheel to change a graphical user interface on the user interface.

8. The system of claim 1, wherein the controller and the heated section cooperate to limit a temperature of the drawing device below a temperature of 118 F.

9. The system of claim 1, wherein the processor is responsive to an input from the user to remove the temperature limit from the drawing device.

10. A system comprising:
    a base station having a housing with a first inlet and a first outlet;
    a first extrusion mechanism coupled to the housing upstream of the inlet, the first extrusion mechanism having a first motor operably coupled to a first filament engagement mechanism;
    a first filament holder having a first filament disposed thereon, the first filament holder being coupled to the housing downstream to the first extrusion mechanism, and arranged to transfer the first filament to the first extrusion mechanism;
    a first three-dimensional drawing device separate from the base station and downstream from the first outlet, and sized to be held by a single user, the first drawing device defining a first pathway that receives the first filament from the outlet and transfers the first filament to a first heated section, the first drawing device having a nozzle removably coupled to the first heated section to receive the first filament; and
    a controller having a processor, the controller being coupled to communicate with the first motor and the first heated section, the processor being responsive to executable computer instructions in response to an input from a user to cause the first motor to rotate in a first direction to move the first filament through the first inlet and first outlet to the first drawing device and to cause the first heated section to at least partially melt the first filament moving through the first drawing device.

11. The system of claim 10, further comprising:
    a second extrusion mechanism coupled to the housing, the second extrusion mechanism having a second motor operably coupled to a second filament engagement mechanism;
    a second filament holder having a second filament disposed thereon, the second filament holder being operably coupled to the housing and arranged to transfer the second filament to the second extrusion mechanism;
    wherein the housing has a second inlet and a second outlet, the second extrusion mechanism being positioned adjacent the second inlet; and
    wherein the input from the user is an actuation of an actuator on the first drawing device or a depression of a foot pedal.

12. The system of claim 11, further comprising a second three-dimensional drawing device separate from the base station and sized to be held by a single user, the second drawing device defining a second pathway that receives the second filament from the second outlet and transfers the second filament to a second heated section, the second drawing device having a nozzle removably coupled to the second heated section to receive the second filament.

13. The system of claim 11, wherein the first three-dimension drawing device further includes a second pathway that receives the second filament from the second outlet and transfers the second filament to the first heated section.

* * * * *